(12) United States Patent
Kieliszek et al.

(10) Patent No.: US 9,377,368 B2
(45) Date of Patent: Jun. 28, 2016

(54) TEMPERATURE SENSOR AND TEMPERATURE PROBE

(71) Applicant: Cochlear Limited, Macquarie University (AU)

(72) Inventors: Martin Kieliszek, Mount Colah (AU); Dirk Fiedler, Bemboka (AU)

(73) Assignee: Cochlear Limited, Macquarie University (AU)

( * ) Notice: Subject to any disclaimer, the term of this patent is extended or adjusted under 35 U.S.C. 154(b) by 462 days.

(21) Appl. No.: 13/836,472

(22) Filed: Mar. 15, 2013

(65) Prior Publication Data

US 2014/0140371 A1    May 22, 2014

Related U.S. Application Data

(60) Provisional application No. 61/727,240, filed on Nov. 16, 2012.

(51) Int. Cl.
*G01K 13/00* (2006.01)
*G01K 13/02* (2006.01)

(52) U.S. Cl.
CPC ........................... *G01K 13/02* (2013.01)

(58) Field of Classification Search
CPC .................................................. G01K 13/00
USPC .......................................................... 374/134
See application file for complete search history.

(56) References Cited

U.S. PATENT DOCUMENTS

| | | | | |
|---|---|---|---|---|
| 3,664,178 A | * | 5/1972 | Spergel et al. | 73/19.1 |
| 3,878,728 A | * | 4/1975 | Marzetta | 374/170 |
| 3,929,018 A | * | 12/1975 | Turner | 374/158 |
| 4,563,098 A | * | 1/1986 | Bartran | 374/172 |
| 5,015,102 A | * | 5/1991 | Yamaguchi | 374/107 |
| 5,974,893 A | * | 11/1999 | Balcarek et al. | 73/714 |
| 8,505,386 B2 | * | 8/2013 | Colombo et al. | 73/756 |

OTHER PUBLICATIONS

Louis A. Marzetta, U.S. Department of Commerce National Bureau of Standards, "Engineering and Construction Manual for an Instrument to Make Burn Hazard Measurements in Consumer Products", Feb. 1974.

* cited by examiner

*Primary Examiner* — Lisa Caputo
*Assistant Examiner* — Jamel Williams
(74) *Attorney, Agent, or Firm* — McDonnell Boehnen Hulbert & Berghoff LLP

(57) ABSTRACT

The present application discloses instruments, systems, and methods for measuring temperature. In one example, an instrument or heat sensor probe includes a housing that defines a chamber, which is configured for a fluid to circulate therein, and a body of material disposed over the housing. The body has a first side proximal to the housing and a second side distal from the housing. The probe further includes a heat sensor configured for sensing heat at a position spaced inwardly from the second side of the body.

17 Claims, 5 Drawing Sheets

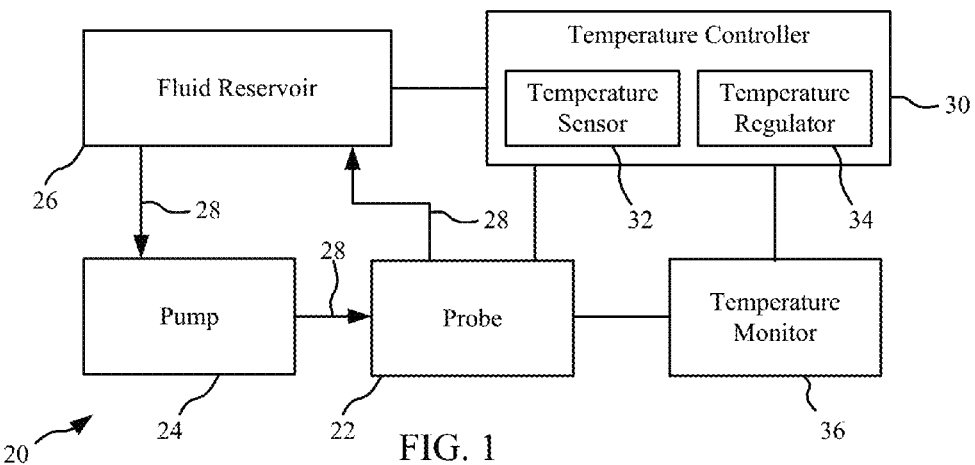
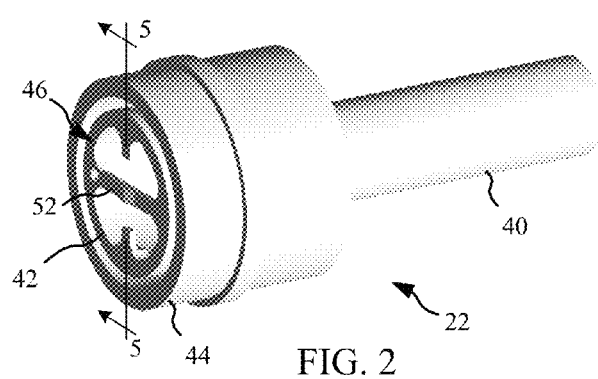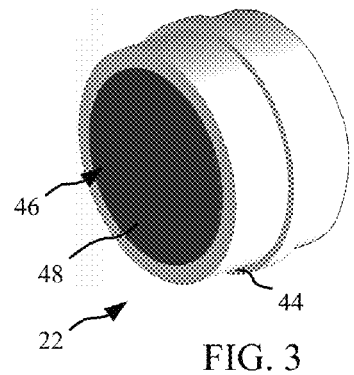
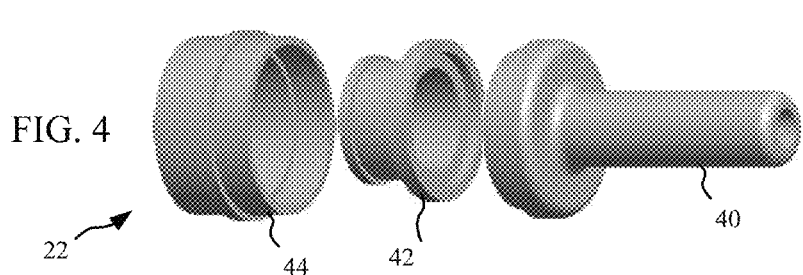

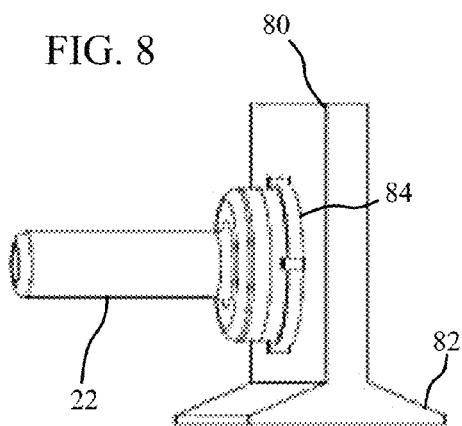
FIG. 8
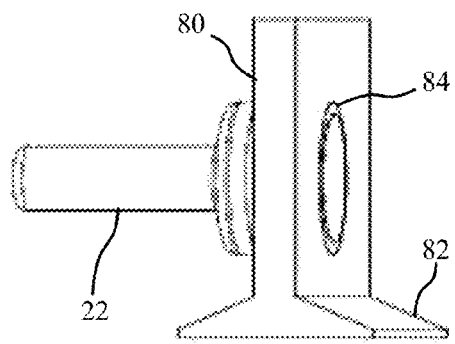
FIG. 9
FIG. 10
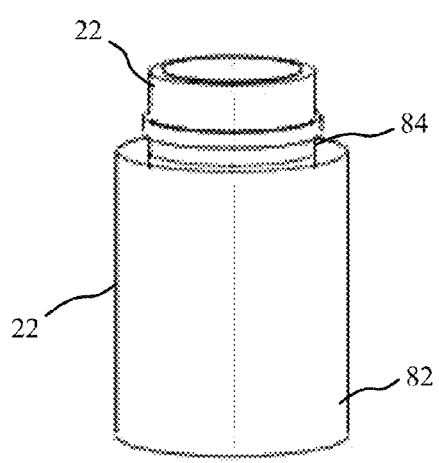
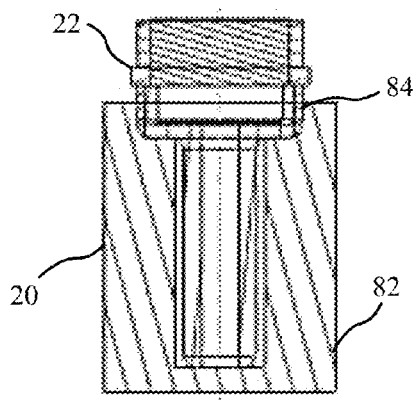
FIG. 11

TEMPERATURE SENSOR AND TEMPERATURE PROBE

BACKGROUND

Temperature or heat sensors are available for measuring temperature in a variety of circumstances. In one example, a heat sensor can be used to measure the effect that a heat source has when brought into proximity with human skin. Illustratively, the heat source can be an electronic device operating under conditions of normal operation, misuse, or abuse. In this example, heat sensors can be used to analyze the potential burn hazard that the heat source may present to a person.

One instrument for analyzing potential burn hazard includes a probe with an embedded heat sensor and a temperature regulator. Generally, in use, the temperature regulator is controlled to heat the probe to around the average temperature of human skin, a heat source is brought into proximity or contact with the probe, and the embedded heat sensor is used to measure a temperature increase caused by the heat source. This instrument, which is sometimes referred to as a thermesthesiometer, is used to analyze the potential burn hazard that a heat source may present when brought into proximity with human skin for relatively short exposure times, such as up to about eight seconds.

It is desired to improve upon prior art arrangements or at least provide one or more useful alternatives.

SUMMARY

The present disclosure improves on existing heat sensing instruments or at least provides a useful alternative by accounting for the role of blood circulation in dissipating heat and regulating temperature in the human body. One example heat sensing instrument of the present disclosure includes a heat sensing probe that is configured to circulate fluid within a body of the probe and near a heat sensing face of the probe to model the flow of blood in the human body.

Generally, in one example of this heat sensing instrument in use, fluid is circulated through the probe at a temperature and flow-rate close to that of human blood in the body. This fluid flow acts to dissipate excess build-up of heat from the probe face in order to provide an accurate representation of the temperature that a human would experience when a heat source is brought into proximity with the skin.

These and other aspects of the present disclosure provide a heat sensing instrument that more accurately represents the expected tissue temperatures that human skin is expected to experience when brought into proximity with heat sources for longer exposure times, such as minutes or even hours. Consequently, the heat or temperature sensing instruments disclosed herein can be used to analyze potential burn hazards for longer exposure times. Such a heat sensing instrument can be used to test electronic devices, such as medical prostheses, that are configured to be in contact with human skin for long exposure times in order to establish compliance with safety standards, for example.

BRIEF DESCRIPTION OF THE DRAWINGS

FIG. 1 is a block diagram of a heat sensor system according to an embodiment.

FIG. 2 is an isometric view of a heat sensor probe according to an embodiment.

FIG. 3 is an isometric view of a heat sensor probe according to an embodiment, with portions removed for clarity and including a body of material at a heat sensing face of the probe.

FIG. 4 is an exploded isometric view of a heat sensor probe according to an embodiment.

FIGS. 8-10 are isometric views of a heat sensor probe coupled to a support jig in accordance with embodiments.

FIG. 11 is a cross-sectional view of a heat sensor probe and support jig taken generally along lines 11-11 of FIG. 10.

DETAILED DESCRIPTION

Figure 5:
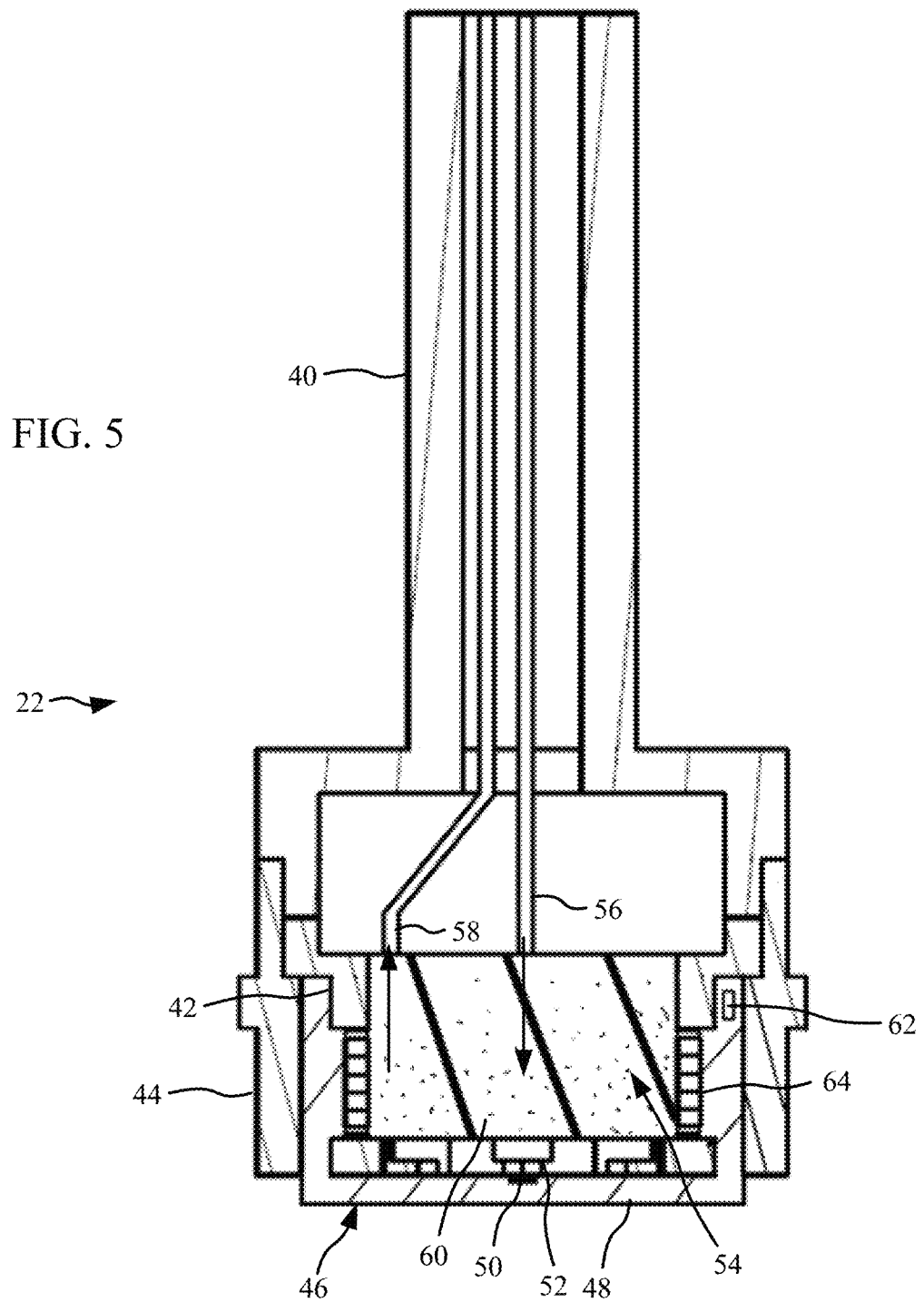
FIG. 5 is a cross-sectional view of a heat sensor probe taken generally along lines 5-5 of FIG. 2 and including a probe face.

The following detailed description describes various features, functions, and attributes with reference to the accompanying figures. In the figures, similar symbols typically identify similar components, unless context dictates otherwise. The illustrative embodiments described herein are not meant to be limiting. Certain features, functions, and attributes disclosed herein can be arranged and combined in a variety of different configurations, all of which are contemplated in the present disclosure.

Referring now to FIG. 1, an example heat sensor system 20 includes a probe 22, a pump 24, and a fluid reservoir 26. The probe 22, pump 24, and fluid reservoir 26 are fluidly coupled together by any suitable connections 28, such as conduits, tubes, piping, valves, joints, flow regulators, and the like. In this non-limiting example, the arrows indicate a direction of fluid flow or circulation from the fluid reservoir 26, through the pump 24 and the probe 22, and back to the fluid reservoir. Generally, the pump 24 is the component that controls the fluid flow through the probe 22. Illustratively, the pump 24 can be a peristaltic pump or an in-line submersible pump with adjustable flow rates. In FIG. 1, the probe 22, pump 24, and fluid reservoir 26 are illustrated as separate blocks, although, in other examples these components can be configured as a single unit or multiple operational units.

The heat sensor system 20 of FIG. 1 also includes a temperature controller 30 that is illustrated as being coupled to the fluid reservoir 26 and the probe 22. In this example, the temperature controller 30 is configured to regulate the temperature of one or more of the probe 22 itself or of a fluid that is circulated through the probe. In FIG. 1, the temperature controller 30 includes or is otherwise coupled to a temperature sensor 32 and a temperature regulator 34. Generally, the temperature controller 30 compares an input temperature from the temperature sensor 32 to a set temperature point and responsively controls the temperature regulator 34 (e.g., a heating element) to heat the probe 22 and/or the fluid, as needed. In one example, the temperature controller 30 is a proportional-integral-derivative (PID) feedback temperature controller that is configured to maintain the set temperature point with minimal overshoot by turning the temperature regulator 34 on/off a number of times before the input temperature reaches the set point. An example of a suitable PID controller is from OMRON Corporation of Kyoto, Japan, and is identified as model number E5CN-Q2ML-500 AC/DC 24.

In one non-limiting example, the temperature controller 30 and the fluid reservoir 26 are configured as a temperature controlled water bath, which includes the temperature sensor 32 and the temperature regulator 34. In another non-limiting example, the temperature controller 30 and the probe 22 are configured with the probe including the temperature sensor 32 (such as a PT-100 temperature sensor or some other resistance thermometer) embedded in the probe and the temperature regulator 34 (e.g., a heating element such as nichrome wire) coupled to the probe. Other configurations are also possible with the temperature controller 30 (and components thereof), being integrated with or separate from the fluid reservoir 26 and/or the probe 22.

Further, the heat sensor system 20 of FIG. 1 includes a temperature monitor 36 that is illustrated as being coupled to the probe 22 and the temperature controller 30. Other configurations are also possible. Generally, the temperature monitor 36 is configured to display a temperature measured by a heat sensor coupled to the probe 22, as will be described in greater detail hereinafter. The temperature monitor 36 can also record and log real-time data from the probe heat sensor and provide the temperature data through a graphical interface. An example of a suitable temperature monitor is from Omega Engineering, Inc. in Stamford, Conn., and is identified as model number HH147U.

Generally, in use, the pump 24 is controlled to circulate a heated fluid through the probe 22. This fluid circulation is used to model the role of blood circulation in regulating temperature in the human body. The temperature controller 30 is configured to maintain the temperature of the fluid, e.g., water, to around the average temperature of human blood, which is about 36.6° C. Further, the pump 24 is configured to adjust a flow rate of the fluid through the probe 22 to provide a generally non-directional, low-velocity perfusion of the fluid through the probe. These adjustable flow rates will vary depending on fluid flow characteristics of the fluid reservoir 26, the pump 24, the probe 22, and the connections 28 therebetween.

The temperature controller 30 can also be configured to at least initially maintain the temperature of the probe 22 to about the average surface temperature of human skin. This average surface temperature correlates to maintaining the temperature of the probe to about 33° C. With this example arrangement, the probe 22 provides a model of human skin such that a heat source that is brought into proximity with the probe can be analyzed for potential burn hazards for short (a few seconds) or long (minutes or hours) exposure times.

Referring now to FIGS. 2-4, example embodiments of the probe 22 are illustrated. More particularly, in FIGS. 2-4, the probe 22 includes a handle portion 40, an inner core or housing 42, and an outer core or housing 44. In these examples, the inner core 42 is disposed generally in the outer core 44 and the handle 40 is coupled to an end of the inner and outer cores to provide a structure for holding and manipulating the probe 20. Further, portions of the inner core 42 and the outer core 44 make up a heat sensing face 46 of the probe. Referring to FIG. 3, the heat sensing face 46 includes a body of material 48 that simulates human skin.

In the present examples, the heat sensing face 46 of the probe 22 includes the body of material 48, which has a thermal characteristic similar to average human skin. This thermal characteristic can be defined by the thermal inertia of the material 48, which can be selected to be around the average thermal inertia of human skin, e.g., around $1.5*10^3 \, J \, m^{-2} \, K^{-1} \, s^{-1/2}$. In one non-limiting example, the body of material 48 can be formed from silicone, such as silicone EPM1-2493 from NuSil Technology of Carpinteria, Calif. This example body of material has a thermal inertia of about $1.52*10^3 \, J \, m^{-2} \, K^{-1} \, s^{-1/2}$. Although, in other examples, the body of material can be made from other types of silicone or other materials that have thermal inertias that approximate human skin.

Further, in one example, the heat sensing face 46 and the body of material 48 have a circular surface with a diameter between about 40-80 mm. In other examples, the shape and size of the heat sensing face 46 and the body of material 48 can be modified. In any event, the present example provides a large enough surface area to analyze the potential burn hazard of a wide variety of heat sources that are brought into proximity with the probe 20. In one particular example, the heat source can be a battery-powered medical device that is in contact with human skin for long periods of time when in use. One such medical device is a hearing prosthesis, which can include a behind-the-ear component that rests against the skull behind a recipient's ear.

In one example, the handle 40 and the outer core 44 are formed from a material with relatively low thermal conductivity. Example materials include moldable or machined polymers, such as polyoxymethylene or polytetrafluoroethylene. These types of materials help to insulate the inner core 42 and the body of material 48. Further, in one example, the inner core 42 (or portions thereof) is made from a thermally conductive material, such as copper, such that the flow of fluid therethrough can more effectively dissipate heat from the body of material 48, similarly to the role of blood under the skin. Generally, in this example, any thermally conductive material with a thermal conductivity above about 100 $Wm^{-1}K^{-1}$ can be used to form portions of the inner core 42.

Referring now to FIG. 5, an example probe 22 is similar to the probes of FIGS. 2-4 and includes a handle portion 40, an inner core 42, an outer core 44, a heat sensing face 46, and a body of material 48 that models human skin. In this example, the body of material 48 is shown as encapsulating a majority of the inner core 42.

The probe of FIG. 5 also includes a heat sensor 50 configured to sense heat at a position spaced inwardly from the heat sensing face 46 of the body of material 48. Any suitable heat sensor 50 can be used in the probe 22, such as a T-type thermocouple. In FIG. 5, the heat sensor 50 is illustrated as being coupled to a bridge 52 portion of the inner core 42 (also illustrated generally in FIG. 2).

The positioning of the heat sensor 50 with respect to the body of material 48 is modeled after the depth of heat sensing nerves underneath human skin. This depth varies depending on the portion of the human body that is to be modeled but is generally between about 70-150 um. In one example, the heat sensor 50 is positioned to measure temperature at a position about 70-80 um inwardly from the heat sensing face 46. This depth approximately models the depth of heat sensing nerves around the human skull. In another example, the heat sensor 50 is positioned to measure temperature at a position about 95-105 um inwardly from the heat sensing face 46. This depth approximately models the depth of heat sensing nerves at the fingertips.

The probe of FIG. 5 also includes a cavity 54, which in this example is defined generally by portions of the inner core 42. The cavity 54 also includes an inlet 56 and an outlet 58 that are configured so that a fluid flows into the cavity through the inlet, circulates within the cavity, and flows out of the cavity through the outlet. In one example, the inlet 56 and outlet 58 are positioned to promote a non-directional flow of liquid, similar to blood perfusion in human tissue. This non-directional flow of liquid can be accomplished by spacing the axes of the inlet and the outlet from one another, as illustrated generally in FIG. 5. Other arrangements of the inlet 56 and the outlet 58 are also contemplated, such as angling the inlet and the outlet with respect to one another.

Further, the inlet 56 can be generally axially aligned with the position at which the heat sensor 50 is configured to measure temperature. This arrangement of the inlet 56 over the heat sensor 50 increases the effect that the heated fluid has in dissipating heat.

As was discussed generally hereinabove, the fluid flow can be controlled by a pump that is further coupled to a fluid reservoir, such as a temperature controlled fluid reservoir. This fluid flow is used to model the role of human blood in regulating temperature in the human body. In one example, the cavity 54 includes a porous material 60 to aid in the random perfusion of fluid throughout the cavity, similar to blood perfusion in human tissue. Illustratively, the porous material 60 can be a heat-conductive material, such as steel wool, or can be some other type of a non-heat-conductive sponge-like material.

The example probe 22 illustrated in FIG. 5 also includes a second temperature sensor 62 (e.g., a resistance thermometer) for measuring a temperature of the body of material 48 and a temperature regulator 64 (e.g., a nichrome wire) used to heat the body of material to about the average temperature of human skin (e.g., about 33° C.). In this example, the second temperature sensor 62 is embedded relatively deeply within the body of material 48. For example, the second temperature sensor can be embedded about 25 mm from the heat sensing face 46. Further, in the present example, the temperature regulator is a nichrome wire wound around the inner core 42 and is controlled (for example, by the temperature controller 30 of FIG. 1) to heat the body of material, as needed. In another embodiment, the temperature regulator 64 can be omitted and the heated fluid circulating through the probe 22 can be used to heat the body of material to about the average temperature of human skin.

Figure 6:
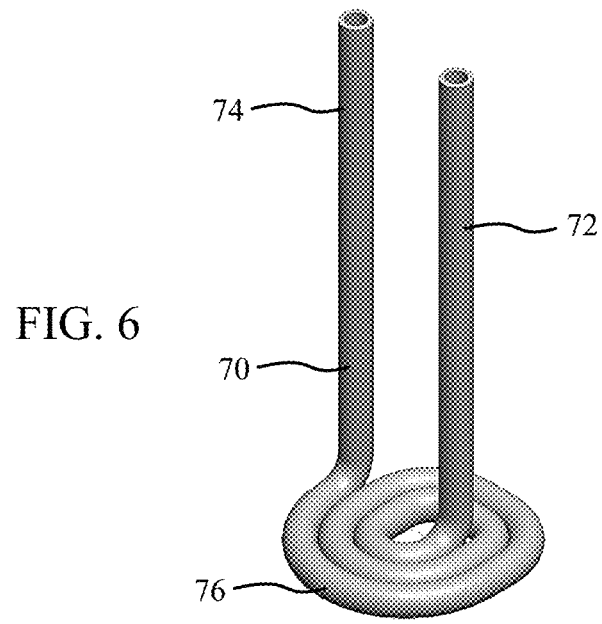
FIG. 6 is an isometric view of a fluid circulation conduit for use with a heat sensor probe in accordance with an embodiment.
Figure 7:
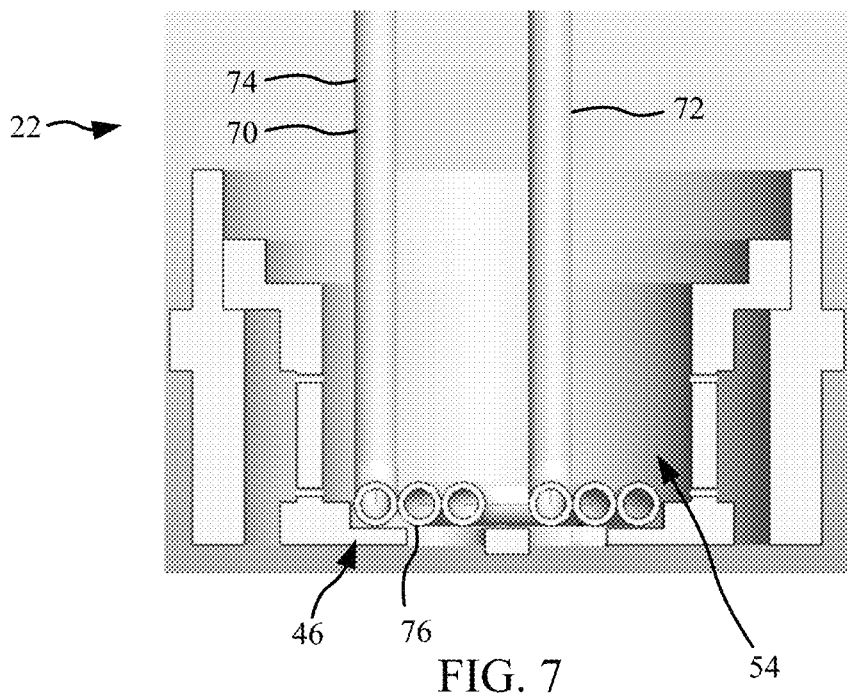
FIG. 7 is a cross-sectional view of a heat sensor probe that is similar to FIG. 5, but with portions removed for clarity, and including the fluid circulation conduit of FIG. 6.

Referring now to FIGS. 6 and 7, an example probe 22 is illustrated with a cavity 54 for fluid circulation similar to the example of FIG. 5. In this example, the cavity 54 includes fluid conduit 70 with an inlet 72, an outlet 74, and a flat coil structure 76, which is disposed generally against the heat sensing face 46. In this example, the fluid conduit 70 is formed from a heat-conductive material, such as copper or any other material with a thermal conductivity above about 100 $Wm^{-1}K^{-1}$. In use, as described hereinabove, a heated fluid is circulated through the fluid conduit 70 to model the role of human blood through the human body.

FIGS. 8-11 illustrate a probe 22 coupled to support jigs 80. Generally, the support jigs 80 are used to hold the probe in a stationary vertical or horizontal (or potentially an angled) position so that a user need not manually hold the probe against a heat source for short or long exposure times. Generally, the support jigs 80 include a base 82 and an opening 84, in which the probe 22 can be disposed.

Figure 12:
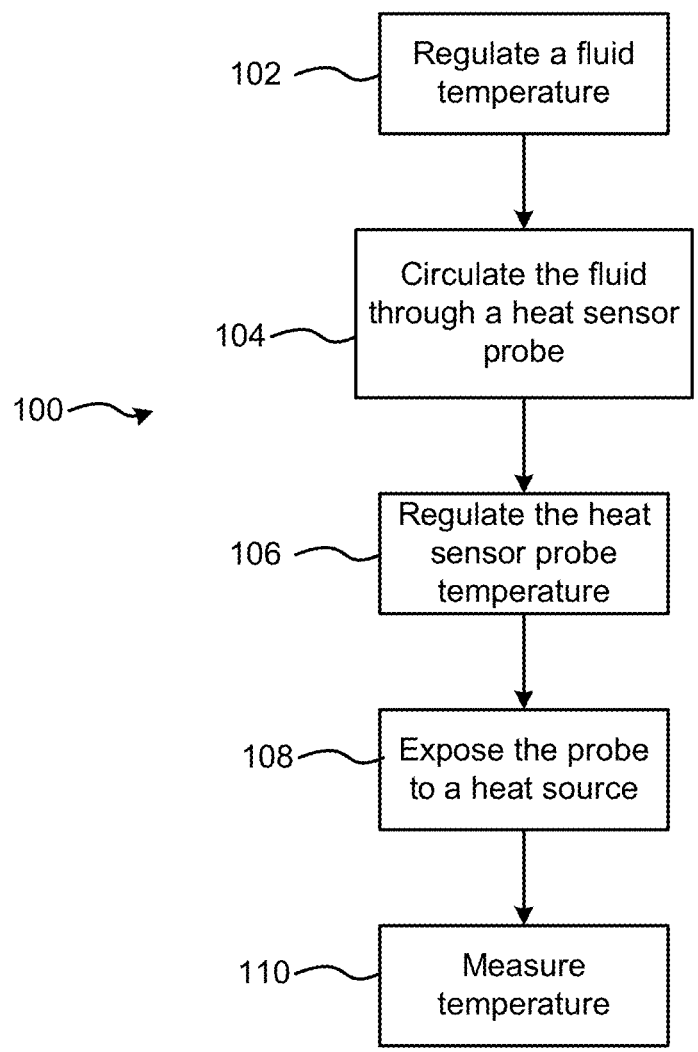
FIG. 12 is a flowchart showing a method for measuring temperature.

Referring now to FIG. 12, an example method 100 is illustrated, which can be implemented by the systems and devices described hereinabove. Generally, the method 100 may include one or more operations, functions, or actions as illustrated by one or more of blocks 102-110. Although the blocks 102-110 are illustrated in sequential order, these blocks may also be performed concurrently and/or in a different order than illustrated. The method 100 may also include additional or fewer blocks, as needed or desired. For example, the various blocks 102-110 can be combined into fewer blocks, divided into additional blocks, and/or removed based upon a desired implementation.

In FIG. 12, at block 102, a heat sensor system, such as the system described above, regulates a fluid temperature. For example, a temperature controlled water bath can maintain the water temperature to around the average temperature of human blood (about 36.6° C.). At block 104, a pump can be used to circulate fluid through a heat sensor probe. As described above, the heat sensor probe generally includes a cavity that is adjacent a heat sensing face of the probe. At block 104, the heated fluid is circulated adjacent the heat sensing face of the probe to model blood circulation in the human body.

At block 106, a temperature controller can be used to regulate the heat sensor probe temperature to around the average surface temperature of human skin (about 33° C.). This temperature regulation can be accomplished by circulating the heated fluid through the probe. In another example, the temperature regulation is aided by using a separate heating element (e.g., nichrome wire wound around the probe) to heat the probe.

At block 108, a heat source is brought into proximity with the probe and, at block 110, the probe temperature is measured. More particularly, the probe can be exposed to the heat source of any desired length of time and the probe temperature is measured generally at a position spaced inwardly from a heat sensing face of the probe. As discussed above, this process of measuring temperature can be used to model a human temperature response when skin is exposed to a heat source.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A heat sensor probe comprising:
   a housing that defines a chamber, wherein the chamber is configured for a fluid to circulate therein;
   an inlet and an outlet in fluid communication with the chamber;
   a body of material disposed over the housing, wherein the body has a first side proximal to the housing and a second side distal from the housing;
   a fluid circulation conduit disposed in the chamber and coupled to the inlet and the outlet, wherein the conduit is configured to circulate fluid adjacent the first side of the body of material; and
   a heat sensor configured for sensing heat at a position spaced inwardly from the second side of the body.

2. The heat sensor probe of claim 1, wherein the body of material has a thermal inertia that is similar to the thermal inertia of human skin.

3. The heat sensor probe of claim 1, wherein the housing has a thermal conductivity above about 100 $Wm^{-1}K^{-1}$.

4. The heat sensor probe of claim 1, wherein the heat sensor is configured to sense heat at a position spaced between about 70-80 um inwardly from the second side of the body.

5. The heat sensor probe of claim 1, further comprising a porous material disposed in the chamber.

6. The heat sensor probe of claim 5, wherein the porous materials includes steel wool.

7. The heat sensor probe of claim 1, wherein the inlet is generally axially aligned with the position at which the heat sensor is configured to sense heat and the inlet is spaced axially away from the outlet.

8. The heat sensor probe of claim 1, further comprising a second heat sensor configured to measure a temperature of the body of material and a heating element configured to regulate a temperature of the body of material.

9. A heat sensor system comprising:
   a housing that defines a chamber and having an inlet and an outlet;
   a reservoir for a fluid;

a pump coupled to the reservoir and to the inlet of the housing, wherein the pump is configured to circulate fluid from the reservoir through the chamber;

a heating element for regulating a temperature of the fluid;

a body of material disposed over the housing, wherein the body has a first side proximal to the housing and a second side distal from the housing; and a heat sensor configured for sensing heat at a position spaced inwardly from the second side of the body.

10. The heat sensor system of claim 9, wherein the body of material has a thermal inertia that is substantially similar to the thermal inertia of human skin and the housing has a thermal conductivity above about 100 Wm$^{-1}$K$^{-1}$.

11. The heat sensor system of claim 10, further comprising a temperature monitor for displaying and recording a temperature measured by the heat sensor.

12. The heat sensor system of claim 10, further comprising a support jig for holding the probe in a stationary position.

13. The heat sensor system of claim 10, further comprising a porous material disposed in the chamber.

14. The heat sensor system of claim 10, further comprising a fluid conduit with a flat coil structure disposed in the chamber.

15. A method for measuring temperature comprising:

circulating a fluid through a cavity adjacent to a heat sensing face, wherein the heat sensing face further includes a body of material that has a thermal inertia that is similar to the thermal inertia of human skin;

bringing a heat source into proximity with the heat sensing face; and measuring a temperature at a position between about 70 um to 150 um spaced inwardly from the heat sensing face.

16. The method of claim 15, further comprising regulating the fluid at a temperature of about 36° C.

17. The method of claim 15, further comprising regulating, at least initially, a temperature of the heat sensing face to about 33° C.

* * * * *